Patented Feb. 13, 1934

1,946,649

UNITED STATES PATENT OFFICE 1,946,649

VEGETABLE JELLY COMPOSITION

Arthur W. Thomas, New York, and Morris Mattikow, Brooklyn, N. Y.

No Drawing. Application November 18, 1929
Serial No. 408,156

6 Claims. (Cl. 99—11)

The present invention relates to edible vegetable jelly compositions and more particularly to edible jelly compositions containing a vegetable base and an addition agent and being suitable for use as a comestible.

It is well known that gelatin used in the manufacture of gelatin for comestible purposes, such as desserts, is made from animal material. A common process usually employed involves the treating or cooking of animal skins, tendons, hoofs bones and the like in hot water in the presence of dilute acids. After purification, the animal gelatin thus produced was incorporated with other ingredients to form a substance capable of being dissolved in hot water and then of being set solid by the application of a low temperature. When the gelatin was set it was utilized as a dessert.

It is well known that some people are averse to eating meat products or food stuffs of animal origin, while others do not eat meat products because of certain religious canons or laws. For instance, Jews who observe the traditional Mosaic dietary laws cannot eat many jellies, jelly powders, or gelatines now on the market because these products contain animal gelatin. Many attempts have been made to remedy the foregoing situation by providing compositions which were unobjectionable and were acceptable, but these attempts as far as we are aware have been unsatisfactory for one reason or another.

It is an object of the present invention to remedy the aforementioned short comings by providing a jelly-like mass the base of which is a composition of vegetable origin.

It is another object of the invention to provide a jelly-like mass which is tough and plastic and yet flexible.

It is a further object to provide a jelly-like mass which sets quickly and at ordinary room temperature.

It is also within the contemplation of the invention to provide a jelly-like mass which sets to a stable transparent jelly when a relatively large amount of sugar is dissolved therein, A still further object is to provide a jelly-like mass whose base is a material of vegetable origin which is practically odorless.

In accordance with our invention we provide a composition which, because of its vegetable origin, can be eaten by all persons. This composition has the property of setting into a stable, solid jelly-like mass of texture suitable for edible purposes.

Our composition broadly stated contains a base which is constituted of a material known as agar agar and which is compounded with a vegetable gum, a mucilaginous substance of vegetable origin or a pectous substance.

We have discovered that our new composition which contains a mucilaginous substance or a vegetable gum or a pectous substance and agar agar produces a jelly which is more plastic than a plain agar agar jelly and which is not detrimentally affected by the concentration of acids usually embodied in jelly compositions. When agar agar is used alone and is dissolved in hot water and allowed to set a jelly-like mass of friable nature is produced. When acids are added to agar agar, instead of a friable jelly, a soft slimy mass is produced. We have found that these undesirable qualities of friability and softness which are common in agar agar jellies can be avoided by incorporation with agar agar, of a vegetable gum, a mucilaginous substance of vegetable origin or a pectous substance.

When relatively large amounts of sugar are added to our composition a jelly-like mass is produced which is not only tough and flexible but is also transparent. In many cases where it is desirable to have a clear transparent jelly-like mass, it is advisable to add sugar in an amount upward of about 40% of the total weight of the jelly-like mass.

Our invention will be made clear by the following examples which are typical in character and which are merely illustrative and are not to be taken as limiting the scope of the invention.

*Example No. 1*

15 parts of granulated or other suitable sugar are mixed with 1 part of agar agar, 1 part of gum karaya, 3/40 parts of certified strawberry flavor, 3/80 parts of dry certified strawberry color and 4/10 parts of tartaric acid. In making the product, a portion of the sugar has added to it the flavor in which the color is dissolved and the whole mixed together. To this mixture the remainder of the sugar is added. After thoroughly mixing until dry, powdered agar agar in ground form and gum karaya are added to the mixture. Finally, powdered tartaric acid is added and the whole is thoroughly mixed.

*Example No. 2*

15 parts by weight of sugar
1 part of agar agar
1 part of gum karaya
3/40 parts of raspberry flavor
3/80 parts of dry color
4/25 parts of tartaric acid

*Example No. 3*

15 parts of sugar
1 part of agar agar
3/4 parts of gum karaya
1/40 parts of cherry flavor
3/80 parts of dry certified color
4/5 parts of tartaric acid

*Example No. 4*

1 part of agar agar
1/2 parts of gum karaya
3 1/2 parts of cocoa
15 parts of sugar

*Example No. 5*

15 parts of sugar
1 part of agar agar
1/10 part of pectin
3/80 part of raspberry flavor
3/80 part of color
4/25 part of citric acid The mixtures described in the foregoing examples are dissolved in about 100 parts of hot water and are completely dissolved therein. After the mixture is dissolved, the aqueous solution is allowed to stand and to set. In practice this solution will set at ordinary room temperatures to a stiff and elastic jelly-like mass in about one hour's time. A low temperature, such as can be obtained in an ice box, however, will effect stiffening in a shorter time, although it is not necessary.

The effect of incorporating one of our additional agents such as a vegetable gum and a muscilaginous substance of a vegetable origin or a pectous substance to agar agar in the presence of acid, can be appreciated by making a comparative test. For instance, if one gram of agar agar is dissolved in 100 c.c. of hot tartaric acid solution which is 0.025 molar with respect to tartaric acid, a soft slimy jelly results. On the other hand, if the same solution is taken and 1 gram of gum karaya is added there is obtained a jelly which is stiffer and more elastic than the one obtained without the addition of this gum.

It will be observed that our invention contemplates the addition of a modifier such as gum karaya to agar agar to produce a firm tough jelly-like mass which sets very quickly at ordinary room temperature.

It will be further observed that our invention provides a composition of matter to which relatively large amounts of sugar may be added to produce a transparent elastic jelly. It will be further observed that a relatively small amount of pectin makes the jelly smooth and soft.

Although we have mentioned certain specific ingredients and proportions, it is to be observed that equivalent substances and proportions are to be considered to be within the scope of the claims. For instance, in place of agar agar other gel-forming alginates such as those obtained from Irish or Iceland moss can be used. Instead of gum karaya, gum tragacanth or acacia or other vegetable gums a mucilaginous substance of vegetable origin or a pectous substance can be used. Similarly, other flavors, colors and fruit acids can be employed in place of the ones specified in the examples.

We claim:

1. A vegetable jelly composition substantially devoid of animal constitutents and containing a limited amount of acid less than one part, about one part of agar agar and more than about one half a part to about one part of gum karaya, said composition being in dry form and being capable of dissolving in hot water to yield a stiff and elastic jelly mass upon setting at ordinary room temperatures.

2. A vegetable jelly composition substantially devoid of animal constituents, and containing a limited amount of solid organic acid less than one part, about one part of agar agar, and about one part of gum karaya, said composition being in dry form and being capable of dissolving in hot water to yield a stiff and elastic jelly mass upon setting at ordinary room temperatures.

3. A vegetable jelly composition substantially devoid of animal constituents and containing a limited amount of solid organic acid less than one part, about 15 parts of sugar, about one part of agar agar, and about one part of gum karaya, said composition being in dry form and being capable of dissolving in hot water to yield a stiff and elastic jelly mass upon setting at ordinary room temperatures.

4. A vegetable jelly composition substantially devoid of animal constituents and containing a flavor, a limited amount of solid organic acid less than one part, about 15 parts of sugar, about one part of agar agar, and about one part of gum karaya, said composition being in dry form and being capable of dissolving in hot water to yield a stiff and elastic jelly mass upon setting at ordinary room temperatures.

5. A vegetable jelly composition substantially devoid of animal constituents and containing a fruit flavor, a certified color corresponding to the color of the fruit represented by the fruit flavor, a limited amount of solid organic acid less than one part, about 15 parts of sugar, about one part of agar agar, and about one part of gum karaya, said composition being in dry form and being capable of dissolving in hot water to yield a stiff and elastic jelly mass upon setting at ordinary room temperatures.

6. A stiff and elastic jelly substantially devoid of animal constituents and containing about 100 parts of water, a limited amount of acid less than one part, about one part of agar agar, about one part of gum karaya, and sugar in an amount upward of about 40% of the total weight of jelly, said jelly being capable of setting at ordinary room temperatures.

ARTHUR W. THOMAS.
MORRIS MATTIKOW.